United States Patent
Ikuno

(10) Patent No.: US 10,015,348 B2
(45) Date of Patent: Jul. 3, 2018

(54) IMAGE FORMING APPARATUS THAT EXECUTES RECEIVED JOBS, CONTROL METHOD THEREFOR, AND STORAGE MEDIUM

(71) Applicant: CANON KABUSHIKI KAISHA, Tokyo (JP)

(72) Inventor: Takao Ikuno, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/408,656

(22) Filed: Jan. 18, 2017

(65) Prior Publication Data

US 2017/0214813 A1  Jul. 27, 2017

(30) Foreign Application Priority Data

Jan. 25, 2016  (JP) ................................ 2016-011555

(51) Int. Cl.
| | |
|---|---|
| *G06F 15/00* | (2006.01) |
| *G06F 3/12* | (2006.01) |
| *G06K 1/00* | (2006.01) |
| *H04N 1/00* | (2006.01) |

(52) U.S. Cl.
CPC ..... *H04N 1/00941* (2013.01); *H04N 1/00042* (2013.01); *H04N 1/0096* (2013.01); *H04N 1/00925* (2013.01); *H04N 2201/0094* (2013.01)

(58) Field of Classification Search
CPC .......... H04N 1/00941; H04N 1/00042; H04N 1/00925; H04N 1/0096; H04N 2201/0094
USPC ........................ 358/1.1, 1.15, 1.13, 1.14, 1.9
See application file for complete search history.

(56) References Cited

U.S. PATENT DOCUMENTS

2017/0195524 A1*  7/2017  Akiyoshi ............. H04N 1/4433

FOREIGN PATENT DOCUMENTS

JP        2005153218 A       6/2005

* cited by examiner

*Primary Examiner* — Douglas Tran
(74) *Attorney, Agent, or Firm* — Rossi, Kimms & McDowell LLP

(57) ABSTRACT

An image forming apparatus which appropriately avoids a resource conflict in the image forming apparatus. A checking unit checks whether a type of an application program execution of which has been ordered is a specific type. A control unit allows execution of a job issued by the application program the type of which has been determined as being the specific type, and restricts execution of a job issued by the application program the type of which has been determined as not being the specific type.

13 Claims, 9 Drawing Sheets

○ ··· ALLOW SIMULTANEOUS EXECUTION
× ··· PROHIBIT SIMULTANEOUS EXECUTION

IMAGE FORMING APPARATUS THAT EXECUTES RECEIVED JOBS, CONTROL METHOD THEREFOR, AND STORAGE MEDIUM

BACKGROUND OF THE INVENTION

Field of the Invention

The present invention relates to an image forming apparatus, a control method therefor, and a storage medium, and in particular to an image forming apparatus that executes received jobs, and a control method therefor.

Description of the Related Art

An MFP which is an example of an image forming apparatus that executes received jobs is known. The MFP is able to receive and execute jobs corresponding to functions which the MFP has such as copying, scanning, and faxing functions (hereafter referred to as "MFP function jobs"). In the MFP, resources such as memory for executing MFP function jobs are limited, and hence when a plurality of MFP function jobs is received, execution of jobs is controlled so as to avoid a resource conflict when the plurality of MFP function jobs is executed at the same time. Specifically, to control execution of jobs, whether or not to execute a plurality of received MFP function jobs is controlled based on combination management information for managing combinations of a plurality of MFP function jobs executable at the same time.

A wide variety of applications have lately been developed, and by installing an application in the MFP, it is possible to add a new function to the MFP (see, for example, Japanese Laid-Open Patent Publication (Kokai) No. 2005-153218). When an application is started in the MFP, the MFP is ready to receive jobs executable by this application (hereafter referred to as "application jobs"). In the MFP, when an application job and an MFP function job are received at the same time as well, execution of the application job and the MFP function job needs to be controlled so as to avoid a resource conflict when the application job and the MFP function job are executed at the same time.

In order to control execution of an application job and an MFP function job, however, combination management information for managing not only combinations of MFP function jobs but also combinations of application jobs as well as combinations of MFP function jobs and application jobs is required. On the other hand, as described above, since there are a wide variety of applications, combination management information includes an enormous amount of combinations of jobs. Moreover, when a different application is started, combination management information on this different application is needed. Namely, it is difficult to prepare and manage combination management information because of high complexity, and hence combination management information for controlling execution of an application job and an MFP function job is not usually provided. This presents a problem that a resource conflict in the image forming apparatus is unavoidable when an application job and an MFP function job are executed at the same time.

SUMMARY OF THE INVENTION

The present invention provides an image forming apparatus and a control method therefor, which appropriately avoid a resource conflict in the image forming apparatus, as well as a storage medium.

Accordingly, the present invention provides an image forming apparatus that controls execution of an installed application program, comprising a checking unit configured to check whether a type of the application program execution of which has been ordered is a specific type, and a control unit configured to allow execution of a job issued by the application program the type of which has been determined as being the specific type, and restrict execution of a job issued by the application program the type of which has been determined as not being the specific type, wherein said checking unit and said control unit are implemented by one or more processors.

According to the present invention, a resource conflict in the image forming apparatus is appropriately avoided.

Further features of the present invention will become apparent from the following description of exemplary embodiments (with reference to the attached drawings).

DESCRIPTION OF THE EMBODIMENTS

Hereafter, an embodiment of the present invention will be described in detail with reference to the drawings.

Figure 1:
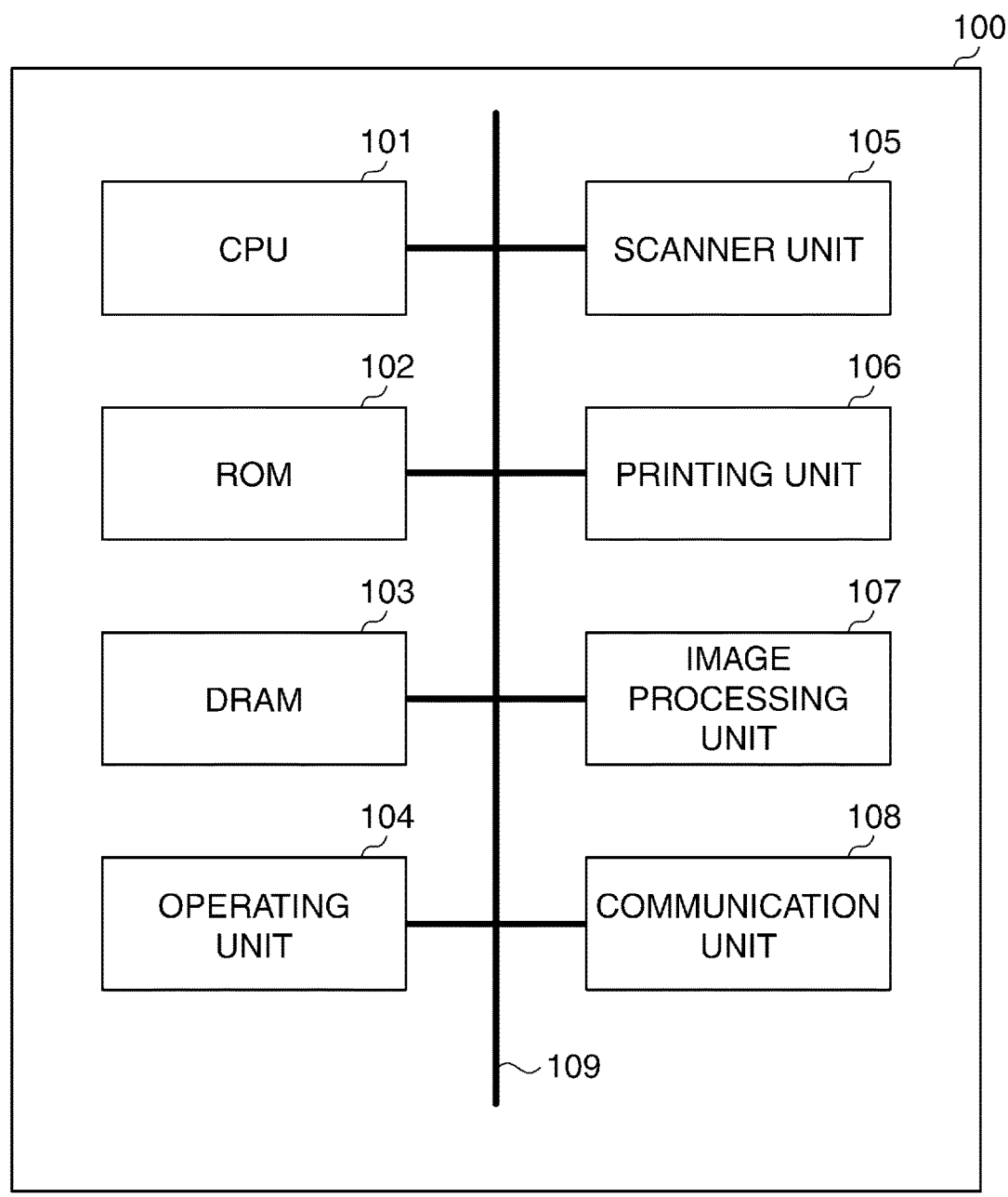
FIG. 1 is a block diagram schematically showing an arrangement of an MFP which is an image forming apparatus according to an embodiment of the present invention.

FIG. 1 is a block diagram schematically showing an arrangement of an MFP 100 which is an image forming apparatus according to the embodiment of the present invention.

Referring to FIG. 1, the MFP 100 has a CPU 101, a ROM 102, a DRAM 103, an operating unit 104, a scanner unit 105, a printing unit 106, an image processing unit 107, and a communication unit 108. The CPU 101, the ROM 102, the DRAM 103, the operating unit 104, the scanner unit 105, the printing unit 106, the image processing unit 107, and the communication unit 108 are connected to one another via a system bus 109. The MFP 100 is an example of a printing apparatus, and the printing apparatus is an example of an image forming apparatus.

Figure 2:
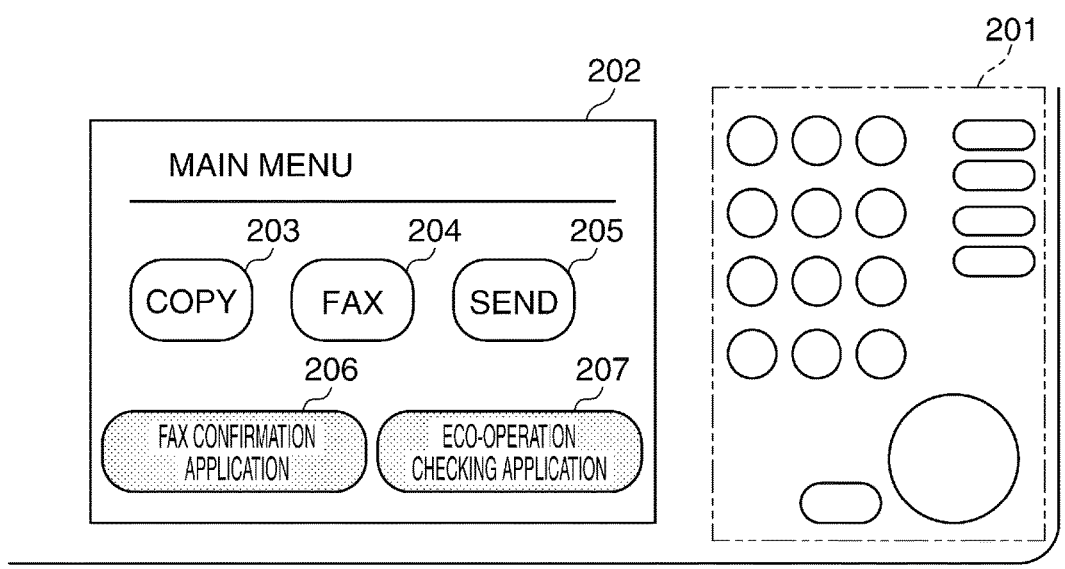
FIG. 2 is a view useful in explaining an arrangement of an operating unit in FIG. 1.
Figure 4:
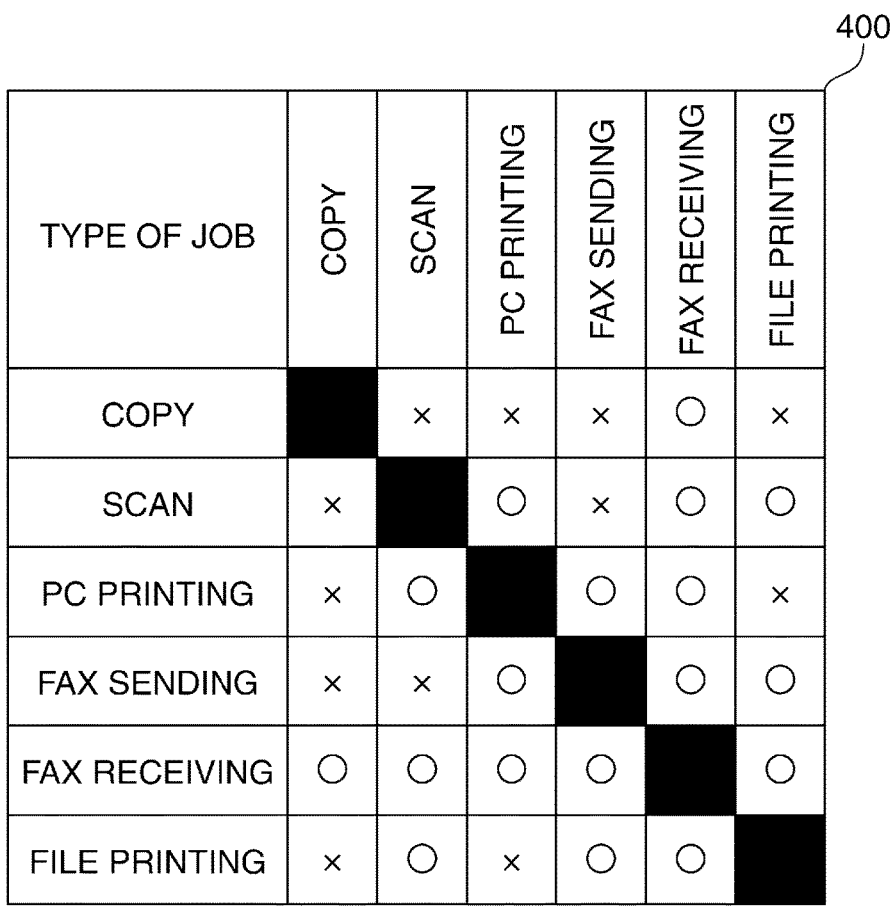
FIG. 4 is a view showing exemplary combination management information for use in the MFP in FIG. 1.

The MFP 100 executes MFP function jobs corresponding to such functions as scanning, copying, and faxing, execution of which is ordered through, for example, operation on the operating unit 104 by a user. A wide variety of applications are allowed to be installed in the MFP 100, and when an installation process for an application is performed, an application program for starting the application and application information data in FIG. 6, to be described later, including information on the application are stored in the ROM 102. When an installed application is started in the MFP 100, the MFP 100 is ready to receive an application job executable by this application. The CPU 101 centrally controls the overall MFP 100 by executing programs stored in the ROM 102. The CPU 101 is one of examples of a processor. The CPU 101 may have plural cores. The CPU 101 can be replaced by plural CPUs or hardware circuits, which is one of examples of plural processors. The ROM 102, which is a flash memory with a relatively small capacity, stores programs to be executed by the CPU 101, a variety of data, and so forth. In the present embodiment, the ROM 102 stores, for example, combination management information 400 in FIG. 4, to be described later, for managing combinations of a plurality of MFP function jobs executable at the same time, and application information data 600 in FIG. 6, to be described later. The DRAM 103, which is a volatile memory, stores program control variables and others. The DRAM 103 also temporarily stores image data and others. The operating unit 104 is a user interface, and as shown in FIG. 2, has an operating key group 201 and a display section 202. The operating unit 104 receives input information input through operation on the operating key group 201 by a user. For example, setting buttons 203 to 205 for setting MFP function jobs, and setting buttons 206 and 207 for setting application jobs are displayed in the display section 202 of the operating unit 104. The scanner unit 105 reads an original placed on an original platen glass, not shown, and generates image data. The printing unit 106 prints the image data on a recoding sheet. The image processing unit 107 carries out a coding-encoding process on data communicated by the communication unit 108. The communication unit 108 carries out data communications with an external apparatus connected via a LAN or the like, not shown.

Figure 3:
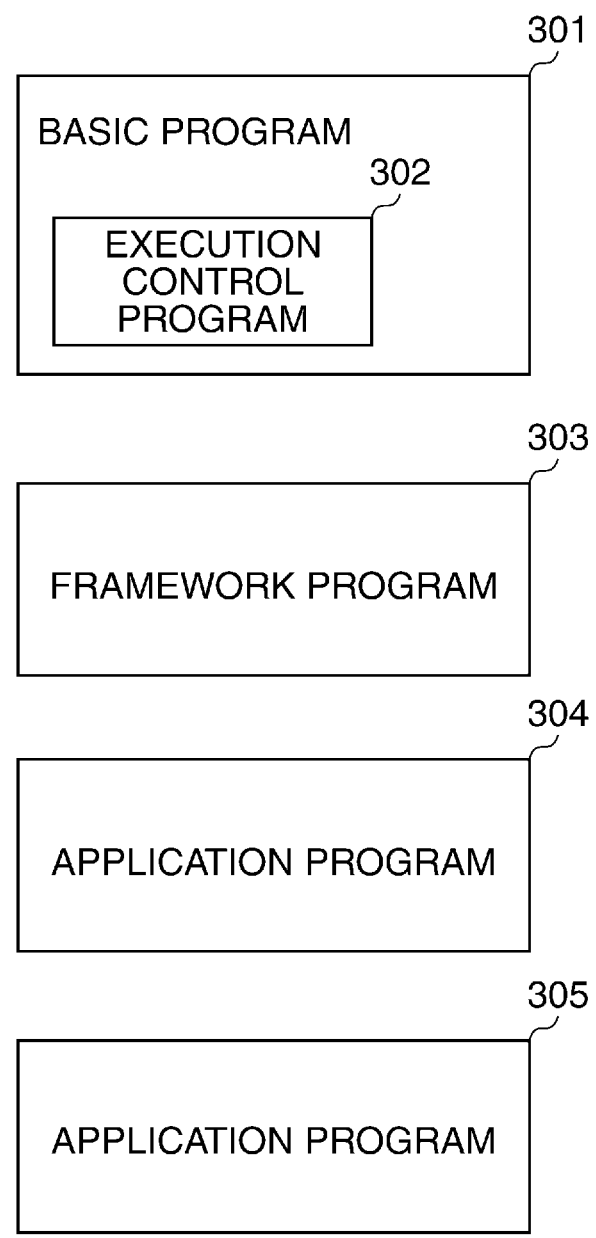
FIG. 3 is a block diagram useful in explaining programs stored in a ROM in FIG. 1.

FIG. 3 is a block diagram useful in explaining programs stored in the ROM 102 in FIG. 1.

In the present embodiment, it is assumed that for example, two applications are installed in advance.

As shown in FIG. 3, a basic program 301, a framework program 303, and application programs 304 and 305 are stored in the ROM 102 of the MFP 100. The basic program 301 includes an execution control program 302.

The basic program 301 is a control program that controls operation of the MFP 100. The execution control program 302 controls execution of jobs so as to avoid a resource conflict when a plurality of jobs including an MFP function job and an application job is executed at the same time. When, for example, execution of a plurality of MFP function jobs is ordered, the execution control program 302 controls whether or not to execute the plurality of MFP function jobs, execution of which is ordered, at the same time based on the combination management information 400 in FIG. 4. The combination management information 400 is stored in advance in the ROM 102, and with respect to all combinations of MFP function jobs executable by the MFP 100, "o" is set for combinations MFP function jobs of which are allowed to be executed at the same time, and "x" is set for combinations MFP function jobs of which are not allowed to be executed at the same time. Setting on each of the combinations in the combination management information 400 is configured based on whether or not resources of a system and hardware of the MFP 100 conflict when MFP function jobs of the subject combination are executed at the same time. It should be noted that although in the above description of the present embodiment, it is assumed that for example, the combination management information 400 is used to control execution of jobs, information for use in controlling execution of jobs is not limited to the combination management information 400. For example, when a different application other than the two applications installed in advance is instructed to be started, combination management information on this different application may be used to control execution of an application job issued by the different application. Also, execution of MFP function jobs and application jobs may be controlled based on application job-included combination management information on combinations of MFP function jobs and application jobs. It is preferred that in the application job-included combination management information, application jobs are grouped so as to minimize the types of application jobs in the application job-included combination management information so that the number of job combinations can be prevented from being enormous. The framework program 303 provides control to mediate between the basic program 301 and the application programs 304 and 305. The application programs 304 and 305 are programs for starting installed applications.

Figure 5:
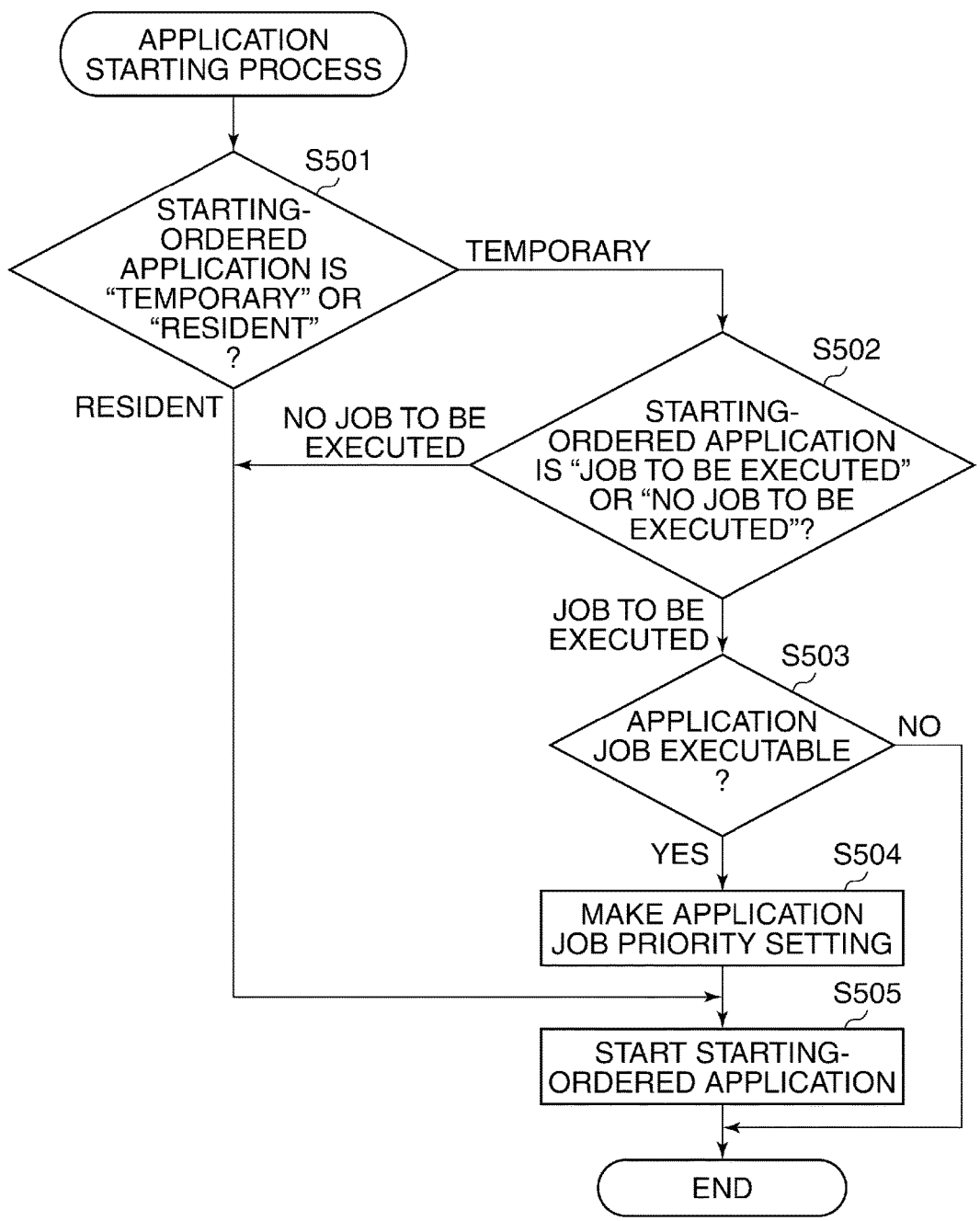
FIG. 5 is a flowchart showing the procedure of an application starting process which is carried out by the MFP in FIG. 1.

FIG. 5 is a flowchart showing the procedure of an application starting process which is carried out by the MFP 100 in FIG. 1.

The process in FIG. 5 is carried out by the CPU 101 executing programs stored in the ROM 102 and is based on the assumption that starting of an application has been ordered through operation on the operating unit 104 by a user.

Figure 6:
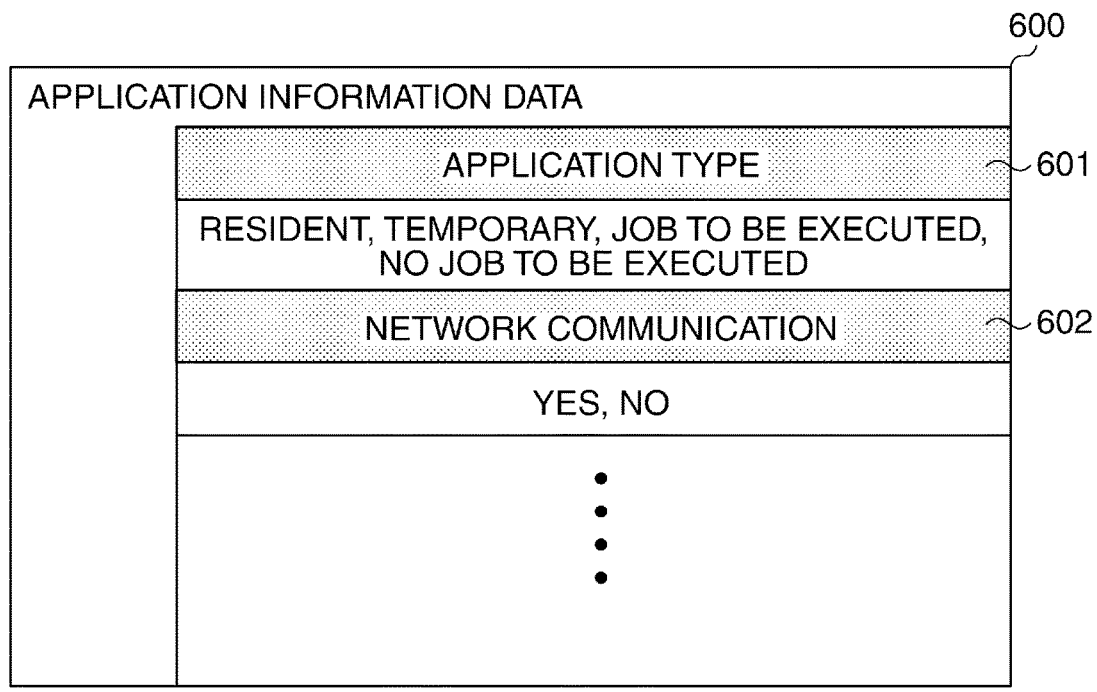
FIG. 6 is a view showing exemplary application information data stored in the ROM in FIG. 1.

Referring to FIG. 5, first, the CPU 101 obtains, from the ROM 102, the application information data 600 in FIG. 6 on an application starting of which has been ordered (hereafter referred to as "the starting-ordered application"). The application information data 600 on applications installed in the MFP 100 is stored in the ROM 102, and the application information data 600 includes an application type 601 and a network communication 602. Specifically, one of "resident" and "temporary" is set as the application type 601, and when "temporary" is set, one of "job to be executed" and "no job to be executed" is set as well. "Resident" is set for a resident application such as a screen saver application continuing to run while the MFP 100 is running. The resident application issues an application job that does not require the same resource as that required for an MFP function job in many cases. For this reason, when this application job and an MFP function job are executed at the same time, resources of the MFP 100 are not likely to conflict. "Temporary" is set for a temporary application that is run for a restricted or limited amount of time. The temporary application is started in response to a starting instruction given by a user, and when execution of a received application job is completed, the temporary application is stopped. "Job to be executed" is potentially set for an application that issues an application job such as a FAX confirmation application which performs printing of image data before faxing, which requires the same resource as that required for an MFP function job. For this reason, when an application job issued by an application for which "job to be executed" is set and an MFP function job are executed at the same time, resources of the MFP 100 are likely to conflict. "No job to be executed" is set for an application that does not issue an application job such as an eco-operation checking application that checks if a print setting on the MFP 100 is an energy-saving setting. For this reason, resource conflict in the MFP 100 caused by starting of an application for which "no job to be executed" is set is not likely to occur. As the network communication 602, whether or not to carry out a network communication is set.

The CPU 101 then determines whether the starting-ordered application is "temporary" or "resident" based on a setting of the application type 601 in the application information data 600 (step S501).

As a result of the determination in the step S501, when the starting-ordered application is "resident", the CPU 101 carries out a process in step S505, to be described later. On the other hand, as a result of the determination in the step S501, when the starting-ordered application is "temporary", the CPU 101 determines whether the starting-ordered application is "job to be executed" or "no job to be executed" (step S502).

As a result of the determination in the step S502, when the starting-ordered application is "no job to be executed", the CPU 101 carries out a process in the step S505, to be described later. On the other hand, as a result of the determination in the step S502, when the starting-ordered application is "job to be executed", the CPU 101 determines whether a condition for starting an application is satisfied. Specifically, the CPU 101 determines whether it is possible or not to execute an application job (step S503). In the step S503, for example, when an MFP function job is being executed, resource are likely to conflict due to the MFP function job and an application job being executed at the same time, and hence the CPU 101 determines that it is impossible to execute an application job. On the other hand, when no MFP function job is being executed, a resource conflict resulting from execution of applications never occurs because an MFP function job and an application job are not executed at the same time, and hence the CPU 101 determines that it is possible to execute an application job.

As a result of the determination in the step S503, when it is impossible to execute an application job, the CPU 101 ends the present process without starting the starting-ordered application. At this time, the CPU 101 may display the setting buttons 206 and 207 in the display section 202 such that they cannot be selected, or may delete the setting buttons 206 and 207 from the display section 202. On the other hand, as a result of the determination in the step S503, when it is possible to execute an application job, the CPU 101 makes an application job priority setting to give high priority to reception of an application job (step S504). The CPU 101 then starts the starting-ordered application (step S505) and ends the present process.

Figure 7:
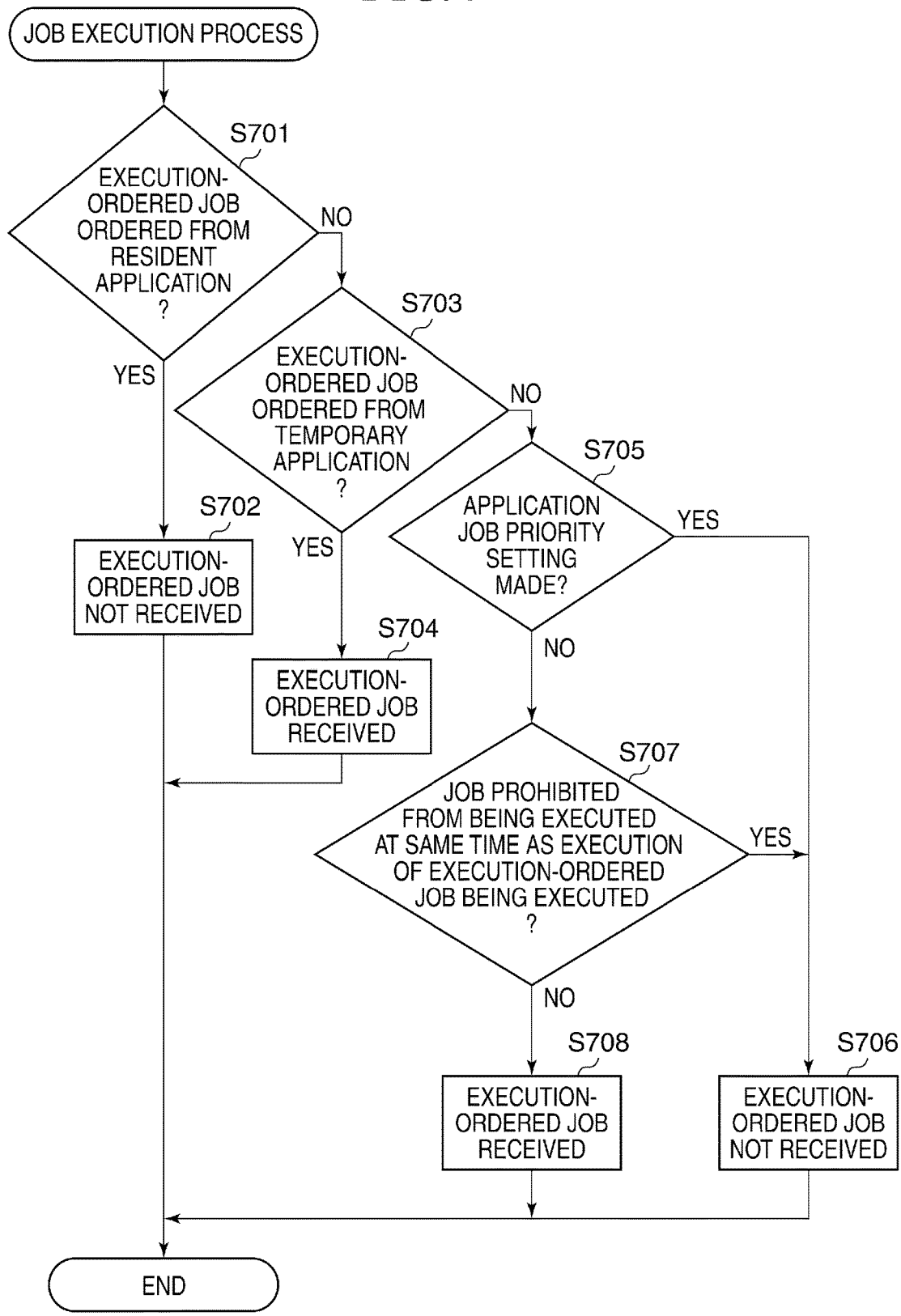
FIG. 7 is a flowchart showing the procedure of a job execution process which is carried out by the MFP in FIG. 1.

FIG. 7 is a flowchart showing the procedure of a job execution process which is carried out by the MFP 100 in FIG. 1.

The process in FIG. 7 is carried out by the CPU 101 executing programs stored in the ROM 102 and is based on the assumption that execution of a job is ordered after completion of the process in FIG. 5.

Referring to FIG. 7, first, when execution of a job is ordered, the CPU 101 identifies an ordering source (submission source) that orders the job execution of which is ordered (hereafter referred to as "the execution-ordered job"). In the present embodiment, a resident application, a temporary application, and the setting buttons 203 to 205 of the operating unit 104 are possible sources that order execution of the execution-ordered job. The CPU 101 determines whether or not the execution-ordered job is a job ordered (submitted) from the resident application among the above possible ordering sources (step S701).

As a result of the determination in the step S701, when the execution-ordered job is a job ordered from the resident application, the CPU 101 does not receive the execution-ordered job (step S702) and ends the present process. On the other hand, as a result of the determination in the step S701, when the execution-ordered job is not a job ordered from the resident application, the CPU 101 determines whether or not the execution-ordered job is a job ordered from the temporary application (step S703).

As a result of the determination in the step S703, when the execution-ordered job is a job ordered from the temporary application, the CPU 101 receives the execution-ordered job (step S704), executes the execution-ordered job, and ends the present process. On the other hand, as a result of the determination in the step S703, when the execution-ordered job is not a job ordered from the temporary application, the CPU 101 identifies the execution-ordered job as an MFP function job, execution of which has been ordered through operation on any of the setting buttons 203 to 205. After that, the CPU 101 determines whether or not an application priority setting has been made (step S705). The application priority setting is made as in the step S504 described above when an application for which "temporary" and "job to be executed" are set is started. It should be noted that in the following description, a job execution of which is ordered through operation on any of the setting buttons 203 to 205 is defined as an MFP function job set through any of the setting buttons 203 to 205.

As a result of the determination in the step S705, when an application priority setting has been made, that is, when an application for which "temporary" and "job to be executed" are set is running, the CPU 101 does not receive the execution-ordered job (step S706). Namely, in the present embodiment, an application for which "temporary" and "job to be executed" are set is running, only an application job is received. After that, the CPU 101 carries out the process in the step S706 and then ends the process.

As a result of the determination in the step S705, when an application priority setting has not been made, the CPU 101 determines whether or not a job prohibited from being executed at the same time as execution of the execution-ordered job is running based on the combination management information 400 (step S707).

As a result of the determination in the step S707, when the job prohibited from being executed at the same time as execution of the execution-ordered job is running, the CPU 101 carries out the process in the step S706. At this time, in the present embodiment, the CPU 101 may receive the execution-ordered job, cause the received execution-ordered job to stand by, and after execution of the job prohibited from being executed at the same time as execution of the execution-ordered job is completed, execute the received execution-ordered job that has been standing by.

As a result of the determination in the step S707, when the job prohibited from being executed at the same time as execution of the execution-ordered job is not running, the CPU 101 receives the execution-ordered job (step S708). In the present embodiment, when an application for which "resident" is set or an application for which "temporary" and "no job to be executed" are set is running, an MFP function job set through any of the setting buttons 203 to 205 may be received. After that, the CPU 101 may execute the received execution-ordered job and end the present process. Moreover, in the present embodiment, whether or not to receive an MFP function job set through any of the setting buttons 203 to 205 may decide not to depend on whether an application for which "resident" is set or an application for which "temporary" or "no job to be executed" are set is running. After that, the CPU 101 executes the received execution-ordered job and ends the present process.

Figure 8:
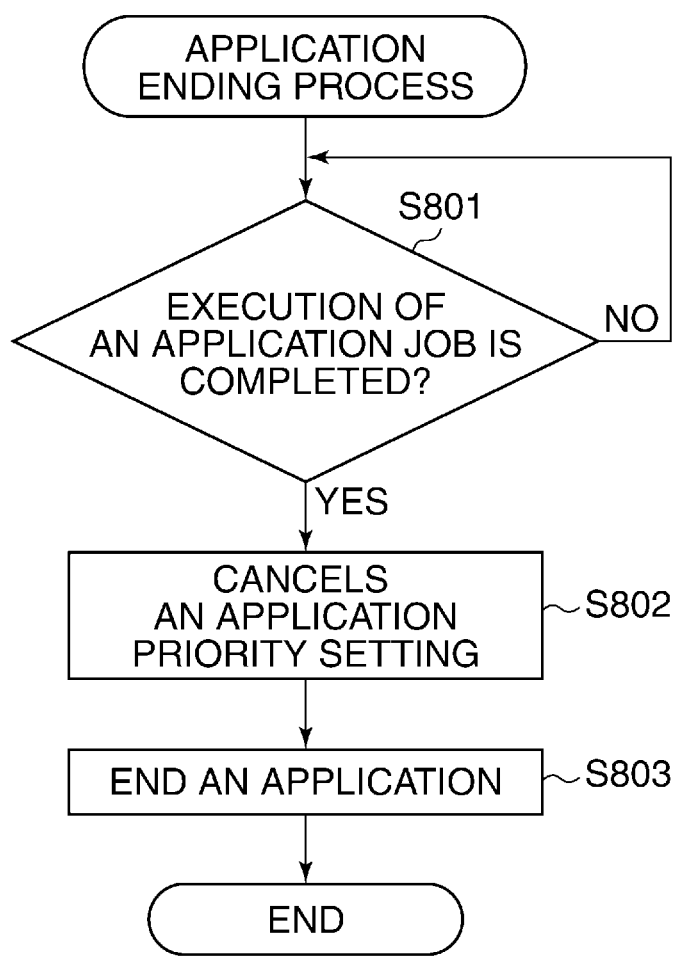
FIG. 8 is a flowchart showing the procedure of an application ending process which is carried out by the MFP in FIG. 1.

FIG. 8 is a flowchart showing the procedure of an application ending process which is carried out by the MFP 100 in FIG. 1.

The process in FIG. 8 is carried out by the CPU 101 executing programs stored in the ROM 102.

Referring to FIG. 8, first, when execution of an application job is completed (YES in step S801), the CPU 101 cancels an application priority setting (step S802), ends an application (step S803), and ends the present process.

According to the processes in FIGS. 5, 7, and 8 described above, while an application is running, execution of an application job submitted from an application is allowed, and execution of an MFP function job set through any of the setting buttons 203 to 205 which is not submitted from an application is prohibited. Thus, an MFP function job set through any of the setting buttons 203 to 205 and an application job are never executed at the same time. As a result, the combination management information 400 for managing only combinations of MFP function jobs or combination management information for managing only combinations of application jobs have only to be prepared for avoiding a resource conflict. Namely, combination management information does not become complicated for avoiding a resource conflict, and it is thus easy to prepare combination management information, and to avoid a situation in which combination management information cannot be prepared.

Moreover, in the processes in FIGS. 5, 7, and 8 described above, when a started application is a temporary application, only an application job is received. Namely, since the time period for which the temporary application is running is restricted, the time period for which only an application job is received becomes limited. As a result, the time period for which an MFP function job set through any of the setting buttons 203 to 205 is received can be secured to avoid a situation in which an MFP function job set through any of the setting buttons 203 to 205 is not executed.

Further, in the processes in FIGS. 5, 7, and 8 described above, when "no job to be executed" is set for a started temporary application, an MFP function job set through any of the setting buttons 203 to 205 can be received. If only an application job is received in the case where "no job to be executed" is set for a started temporary application, an MFP function job set through any of the setting buttons 203 to 205 is not substantially executed while the temporary application is running, and hence resources of the MFP 100 are wasted. On the other hand, by receiving an MFP function job set through any of the setting buttons 203 to 205 in the case where "no job to be executed" is set for a started temporary application, at least an MFP function job set through any of the setting buttons 203 to 205 is allowed to be executed, and hence resources of the MFP 100 are prevented from being wasted.

In the processes in FIGS. 5, 7, and 8 described above, when a started application is a resident application, an MFP function job set through any of the setting buttons 203 to 205 is received. If only an application job is allowed to be received while an application is running, when a resident application is started, an MFP function job set through any of the setting buttons 203 to 205 is not received while the MFP 100 is running, and this MFP function job cannot be executed. On the other hand, an MFP function job set through any of the setting buttons 203 to 205 is received when a started application is a resident application, and hence a situation in which an MFP function job cannot be executed is avoided.

Further, in the processes in FIGS. 5, 7, and 8 described above, no temporary application is started while an MFP function job is being executed. This eliminates the need to receive an application job while an MFP function job is being executed, and prevents an MFP function job and an application job from being executed at the same time. As a result, the need to prepare complicated combination management information is eliminated.

It should be noted that while an application is running, execution of a particular MFP function job among MFP function jobs set thorough the setting buttons 203 to 205 which are not submitted from applications may be allowed.

Figure 9:
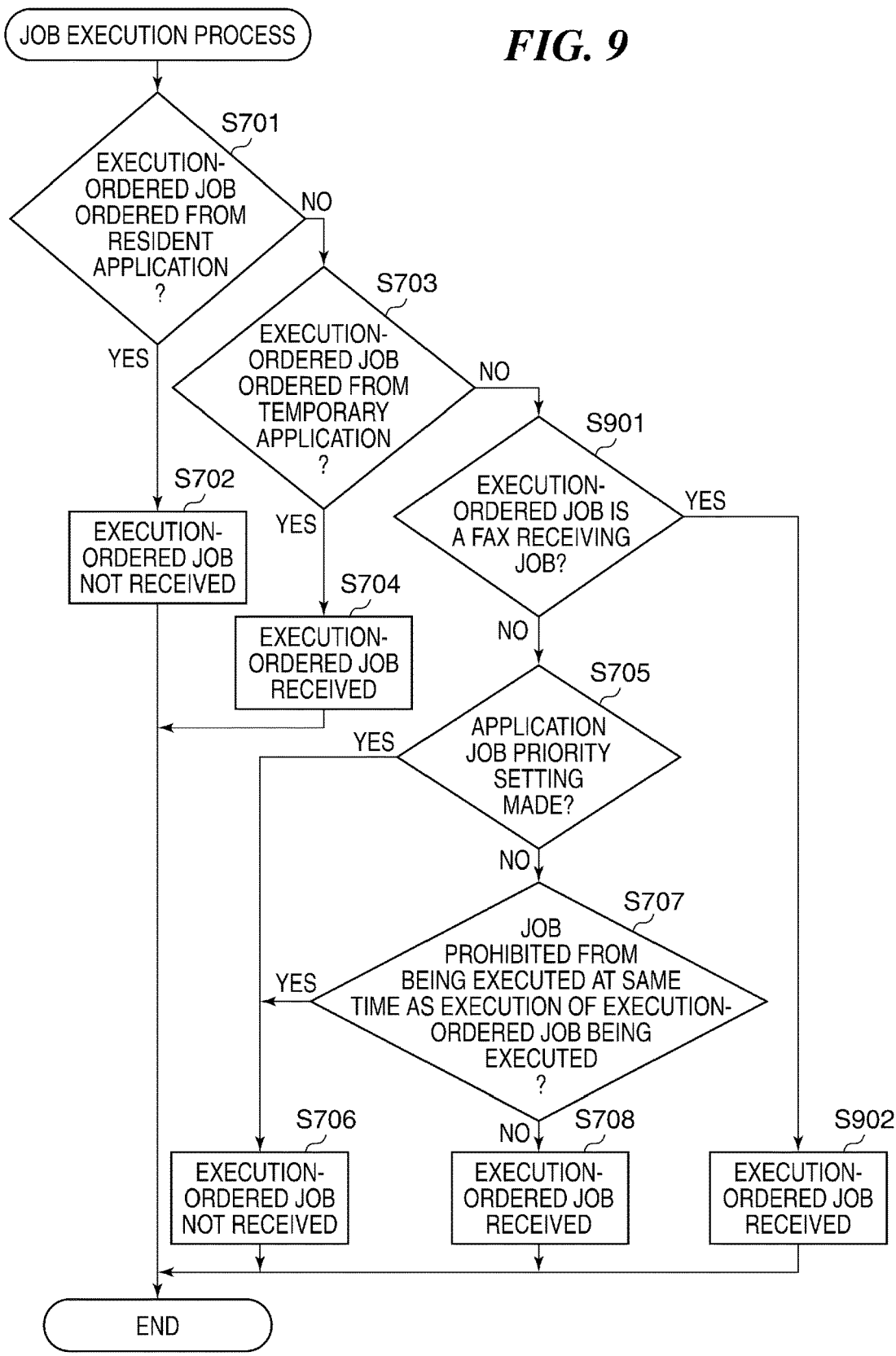
FIG. 9 is a flowchart showing the procedure of a variation of the job execution process in FIG. 7.

FIG. 9 is a flowchart showing the procedure of a variation of the job execution process in FIG. 7.

The process in FIG. 9 is carried out by the CPU 101 executing programs stored in the ROM 102.

Referring to FIG. 9, first, the CPU 101 carries out the processes in the steps S701 to S703 in FIG. 7.

As a result of the determination in the step S703, when the execution-ordered job is a job ordered from a temporary application, the CPU 101 carries out the processes in the step S704 and the subsequent steps. On the other hand, as a result of the determination in the step S703, when the execution-ordered job is not a job ordered by a temporary application, the CPU 101 determines whether or not the execution-ordered job is a FAX receiving job (step S901). A FAX receiving job is a job for which a resource conflict does not occur in the MFP 100 even when the FAX receiving job and either of an MFP function job and an application job are executed at the same time.

As a result of the determination in the step S901, when the execution-ordered job is not a FAX receiving job, the CPU 101 carries out the processes in the step S705 and the subsequent steps. On the other hand, as a result of the determination in the step S901, when the execution-ordered job is a FAX receiving job, the CPU 101 receives the execution-ordered job (step S902), executes the execution-ordered job, and ends the present process.

In the process in FIG. 9 described above, while an application is running, execution of a FAX receiving job which never causes a resource conflict to occur in the MFP 100 even when the FAX receiving job and either of an MFP function job and an application job are executed at the same time among MFP function jobs not submitted from the application is allowed, and execution of the MFP function jobs other than the FAX receiving job is prohibited. This prevents resources of the MFP 100 from being wasted while avoiding a resource conflict in the MFP 100.

In the above description of the present embodiment, the present invention is applied to an MFP which is an image processing apparatus, the present invention should not always be applied to an MFP. For example, the present invention may be applied to any apparatus such as a PC (personal computer) as long as it is able to install an application and executing an application job as well as function jobs corresponding to functions which the apparatus has.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-011555, filed Jan. 25, 2016, which is hereby incorporated by reference herein in its entirety.

What is claimed is:

1. An image forming apparatus that controls execution of an installed application program, comprising:
a checking unit configured to check whether a type of the application program which is instructed to be executed is a specific type; and
a control unit configured to allow execution of a job issued by the application program the type of which has been determined as being the specific type, and restrict execution of a job issued by the application program the type of which has been determined as not being the specific type,
wherein said checking unit checks whether a type of the application program is a resident type or a temporary type,
wherein said control unit allows execution of a job issued by the application program the type of which has been determined as being the temporary type, and restricts execution of a job issued by the application program the type of which has been determined as being the resident type, and
wherein said checking unit and said control unit are implemented by one or more processors.

2. The image forming apparatus according to claim 1, wherein said control unit provides control not to receive jobs issued from other application programs while a job issued by the application program the type of which has been determined as being the specific type is being received.

3. The image forming apparatus according to claim 1, wherein the image forming apparatus is a printing apparatus and further comprises:
a determination unit configured to determine whether or not a condition for starting a specific application installed in the printing apparatus is satisfied when an instruction to start the specific application is input by a user; and
a starting unit configured to start the specific application when the condition is satisfied,
wherein while the specific application is running, said control unit allows execution of a job submitted from the specific application and restricts execution of a job not submitted from the specific application, and
wherein said determination unit and said starting unit are implemented by the one or more processors.

4. The image forming apparatus according to claim 3, wherein said determination unit determines that the condition is satisfied when the printing apparatus is not executing a job.

5. The image forming apparatus according to claim 3, wherein a first application that continues to run while the printing apparatus is running, and a second application that is started in response to a starting instruction from the user are allowed to be installed in the printing apparatus, and
wherein the specific application is the second application.

6. The image forming apparatus according to claim 3, wherein while the specific application is running, said control unit restricts execution of a job that is not submitted from the specific application.

7. The image forming apparatus according to claim 3, wherein while the specific application is running, said control unit allows execution of a facsimile receiving job and prohibits execution of all residual jobs other than the facsimile receiving job among jobs that are not submitted from the specific application.

8. The image forming apparatus according to claim 1, wherein said control unit restricts execution of the job issued by the application program the type of which has been determined as being the resident type by prohibiting execution of the job.

9. The image forming apparatus according to claim 1, wherein the application program of the resident type continues to run while the image forming apparatus is operating after start up, and the application program of the temporary type runs for a predetermined limited amount of time.

10. A control method, implemented by a processor, for an image forming apparatus that controls execution of an installed application program, comprising:
checking whether a type of the application program which is instructed to be executed is a specific type; and
allowing, by the processor, execution of a job issued by the application program the type of which has been determined as being the specific type, and restricting, by the processor, execution of a job issued by the application program the type of which has been determined as being not the specific type,
wherein said checking checks whether a type of the application program is a resident type or a temporary type, and
wherein execution of a job issued by the application program the type of which has been determined as being the temporary type is allowed, and execution of a job issued by the application program the type of which has been determined as being the resident type is restricted.

11. The control method according to claim 10, wherein execution of the job issued by the application program the type of which has been determined as being the resident type is restricted by prohibiting execution of the job.

12. A non-transitory computer-readable storage medium storing a program for causing a computer to execute a control method for an image forming apparatus that controls execution of an installed application program, the control method for the image forming apparatus comprising:
checking whether a type of the application program which is instructed to be executed is a specific type; and allowing execution of a job issued by the application program the type of which has been determined as being the specific type, and restricting execution of a job issued by the application program the type of which has been determined as being not the specific type, wherein said checking checks whether a type of the application program is a resident type or a temporary type, and wherein execution of a job issued by the application program the type of which has been determined as being the temporary type is allowed, and execution of a job issued by the application program the type of which has been determined as being the resident type is restricted.

13. The non-transitory computer-readable storage medium according to claim 12, wherein execution of the job issued by the application program the type of which has been determined as being the resident type is restricted by prohibiting execution of the job.

* * * * *